(12) United States Patent
Castellano et al.

(10) Patent No.: US 8,254,513 B2
(45) Date of Patent: Aug. 28, 2012

(54) INTER-DEVICE ADAPTABLE INTERFACING CLOCK SKEWING

(75) Inventors: Andrew J. Castellano, Laguna Beach, CA (US); Pieter Vorenkamp, Laguna Niguel, CA (US); Chun-Ying Chen, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 56 days.

(21) Appl. No.: 12/830,434

(22) Filed: Jul. 5, 2010

(65) Prior Publication Data

US 2010/0290571 A1 Nov. 18, 2010

Related U.S. Application Data

(63) Continuation of application No. 11/358,148, filed on Feb. 21, 2006, now Pat. No. 7,751,516, which is a continuation of application No. 09/992,664, filed on Nov. 16, 2001, now Pat. No. 7,020,210.

(60) Provisional application No. 60/344,997, filed on Oct. 23, 2001.

(51) Int. Cl.
*H04L 7/00* (2006.01)

(52) U.S. Cl. ........................................................ 375/354

(58) Field of Classification Search .................. 375/354, 375/355, 323, 254, 376, 327, 356; 327/141, 327/147, 156; 710/58, 60; 713/500
See application file for complete search history.

(56) References Cited

U.S. PATENT DOCUMENTS

| 6,687,320 B1 * | 2/2004 | Chiu et al. ................... 375/376 |
| 2001/0018751 A1 * | 8/2001 | Gresham ...................... 713/401 |
| 2002/0097682 A1 * | 7/2002 | Enam et al. ................... 370/241 |
| 2003/0063626 A1 * | 4/2003 | Karlquist ...................... 370/503 |

* cited by examiner

*Primary Examiner* — Khai Tran
(74) *Attorney, Agent, or Firm* — Garlick & Markison; Shayne X. Short

(57) ABSTRACT

Inter-device adaptable interfacing clock skewing. The invention is operable in either one of both of a transmit mode and a receive mode to perform skewing of a transmitted and/or a received signal. The operational parameters including frequency and phase may be determined during auto detect/auto negotiation, they may be programmed externally, or they may be user selected in various embodiments. A device may include a clock generator, one or more divider, and one or more delay cells internally to the device. If desired, a high frequency clock is generated within the device and then divided down to generate the appropriate clock signal that supports the communication and interaction between multiple devices. Registers and/or pins may be used to select the clock frequency and phase of output clock signals. The present invention supports multiple Ethernet protocols between multiple devices including 10BaseT, 100BaseT, and 1000BaseT.

30 Claims, 9 Drawing Sheets

INTER-DEVICE ADAPTABLE INTERFACING CLOCK SKEWING

CROSS REFERENCE TO RELATED PATENTS/PATENT APPLICATIONS

Continuation Priority Claim, 35 U.S.C. §120

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 11/358,148, entitled "Inter-device adaptable interfacing clock skewing," filed Feb 21, 2006, pending, and scheduled to be issued as U.S. Pat. No. 7,751,516 on Jul. 06, 2010, which claims priority pursuant to 35 U.S.C. §120, as a continuation, to the following U.S. Utility Patent Application which is hereby incorporated herein by reference in its entirety and made part of the present U.S. Utility Patent Application for all purposes:

2. U.S. Utility application Ser. No. 09/992,664, entitled "Inter-device adaptable interfacing clock skewing," filed Nov. 16, 2001, issued as U.S. Pat. No. 7,020,210 B2 on Mar. 28, 2006, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/344,997, entitled "Inter-device adaptable interfacing clock skewing," filed Oct. 23, 2001, now expired.

BACKGROUND OF THE INVENTION

1. Technical Field of the Invention

The invention relates generally to device interfacing; and, more particularly, it relates to inter-device adaptable interfacing clock skewing between multiple devices.

2. Description of Related Art

Prior art systems have commonly attempted to employ on board skewing of clock signals between various devices. These on board delay lines typically are extremely space consumptive. As the premium of on board and chip real estate even continues to grow in terms of importance and cost, these approaches of using space on the board to serve as such elements fail to meet the design considerations of space conservation and efficient space utilization.

FIG. 1 is a system diagram illustrating a prior art embodiment of an interfacing clock skewing system 100. Two devices, shown as a device 110 and a device 170 are communicatively coupled together. The device 110 contains a clock 115 that generates a signal that is provided to the device 170. The clock signal has a predetermined frequency and phase. For illustration, we assume that the phase of the clock signal coming from the device 110 (from the clock 115) has a zero phase. However, the device 170 requires a clock signal having a particular phase that may very well be different from the frequency and phase of the clock signal that is provided by the device 110. To generate the proper phase, an on board skewing is used to generate the proper skewing/phase difference as the clock signal propagates from the device 110 to the device 170. The physical arrangement of the on board delay line often requires relatively significant spacing between the devices 110 and 170.

In short, the prior art implementation is to put the delay line on the board. Sometimes a skew of a certain length is used to place a hole in the data that is being communicated between the two devices. This inherently consumes more space and is a less efficient allocation of real estate for the entire system.

Further limitations and disadvantages of conventional and traditional systems will become apparent to one of skill in the art through comparison of such systems with the invention as set forth in the remainder of the present application with reference to the drawings.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWINGS

A better understanding of the invention can be obtained when the following detailed description of various exemplary embodiments is considered in conjunction with the following drawings.

DETAILED DESCRIPTION OF THE INVENTION

Figure 1:
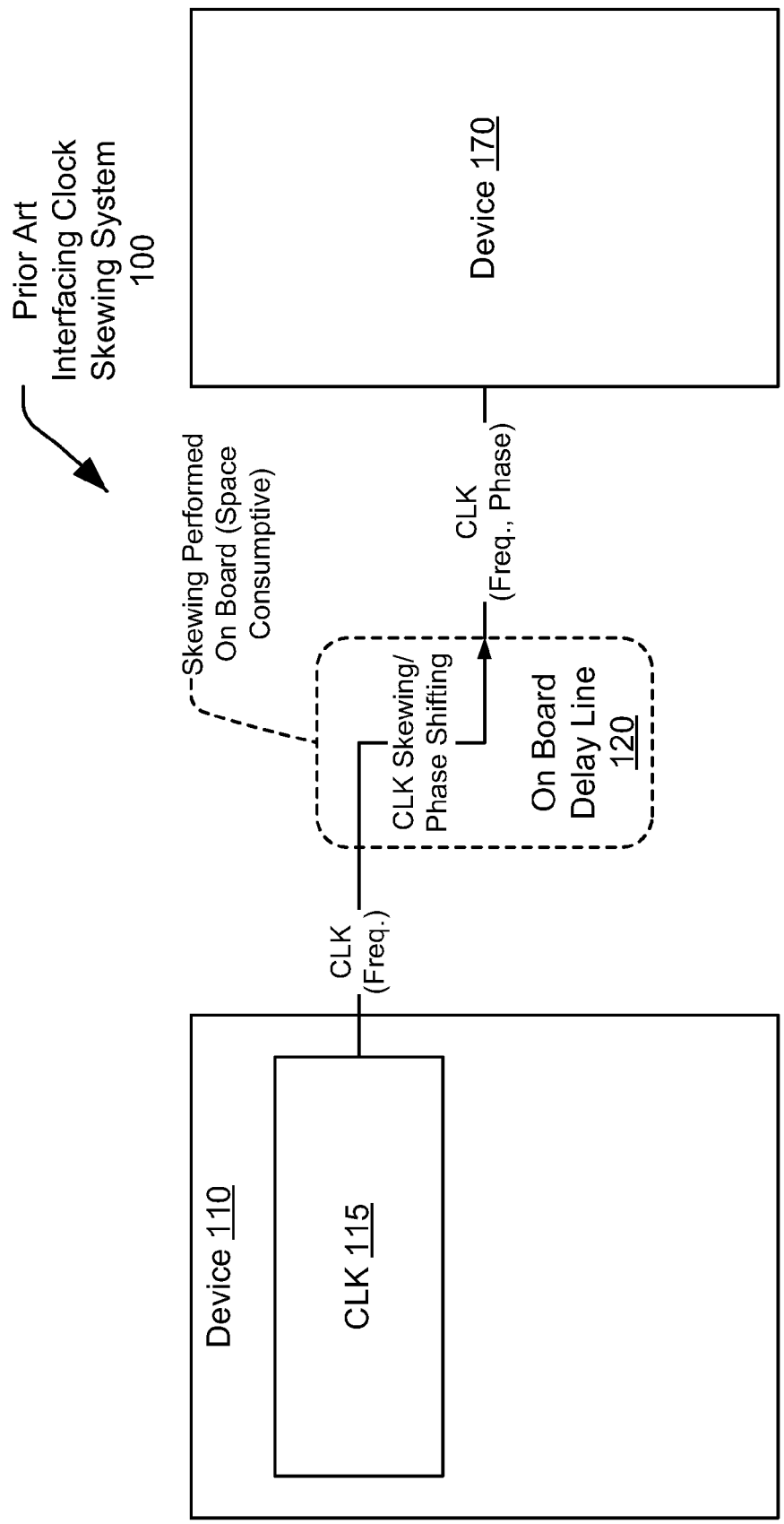
FIG. 1 is a system diagram illustrating a prior art embodiment of an interfacing clock skewing system.
Figure 2:
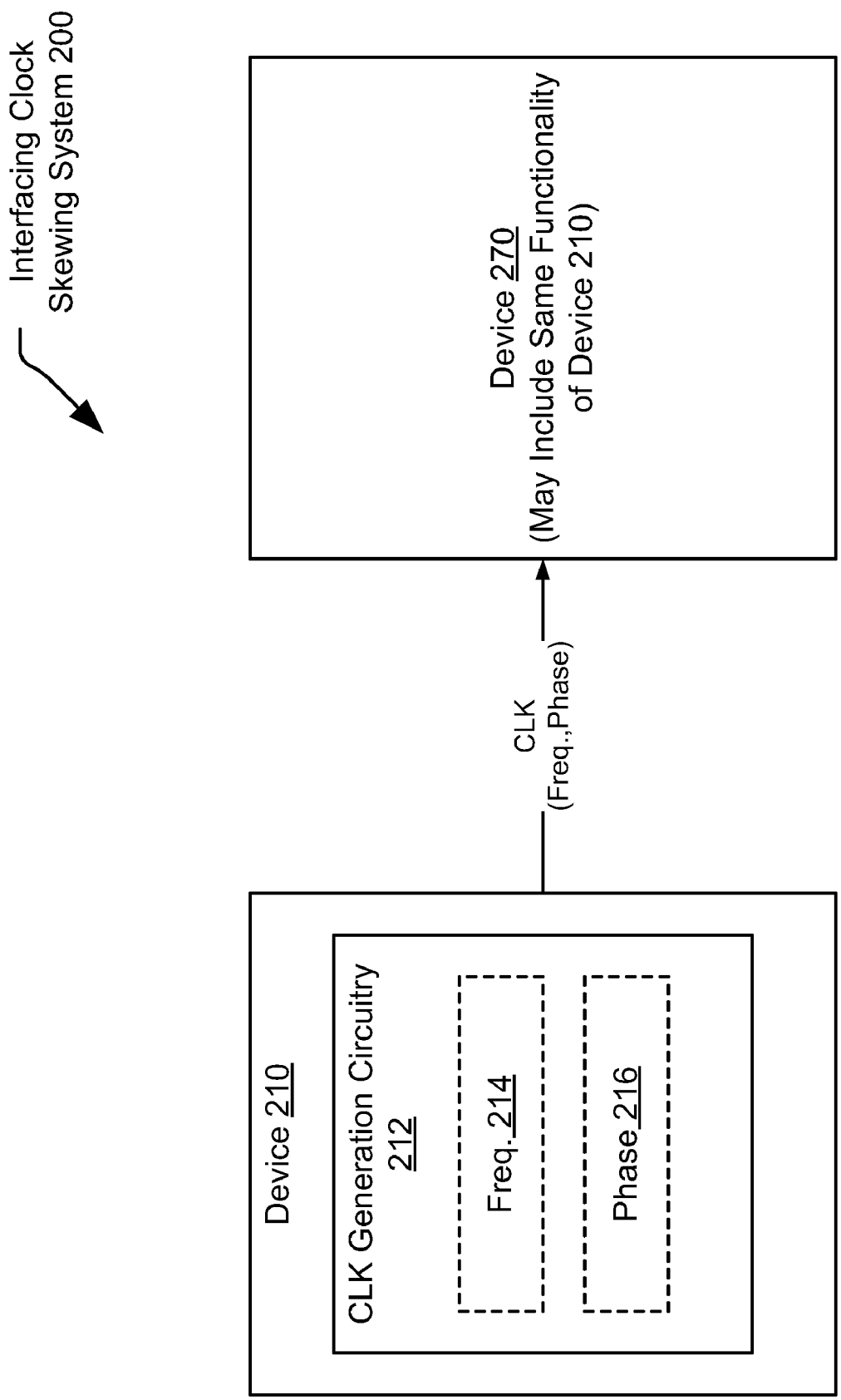
FIG. 2 is a system diagram illustrating an embodiment of an interfacing clock skewing system that is built in accordance with certain aspects of the present invention.

FIG. 2 is a system diagram illustrating an embodiment of an interfacing clock skewing system 200 that is built in accordance with certain aspects of the present invention. A device 210 is communicatively coupled to a device 270. Both of the devices 210 and 270 may include the same functionality in certain embodiments; alternatively, they may have different functionality.

The device 210 contains a clock generation circuitry 212 that is operable to generate a clock signal having a particular frequency 214 and phase 216. In addition, the clock generation circuitry 212 may be operable to generate additional clock signals, having other frequencies and phases as well without departing from the scope and spirit of the invention. At least one clock signal is provided to the device 270 from the device 210. This clock signal has a particular frequency and phase. It is also understood that the device 270 may also be operable to provide a clock signal to the device 210 as well. The clock signals traveling between the devices 210 and 270 may have the same or different frequencies and/or phases.

Figure 3:
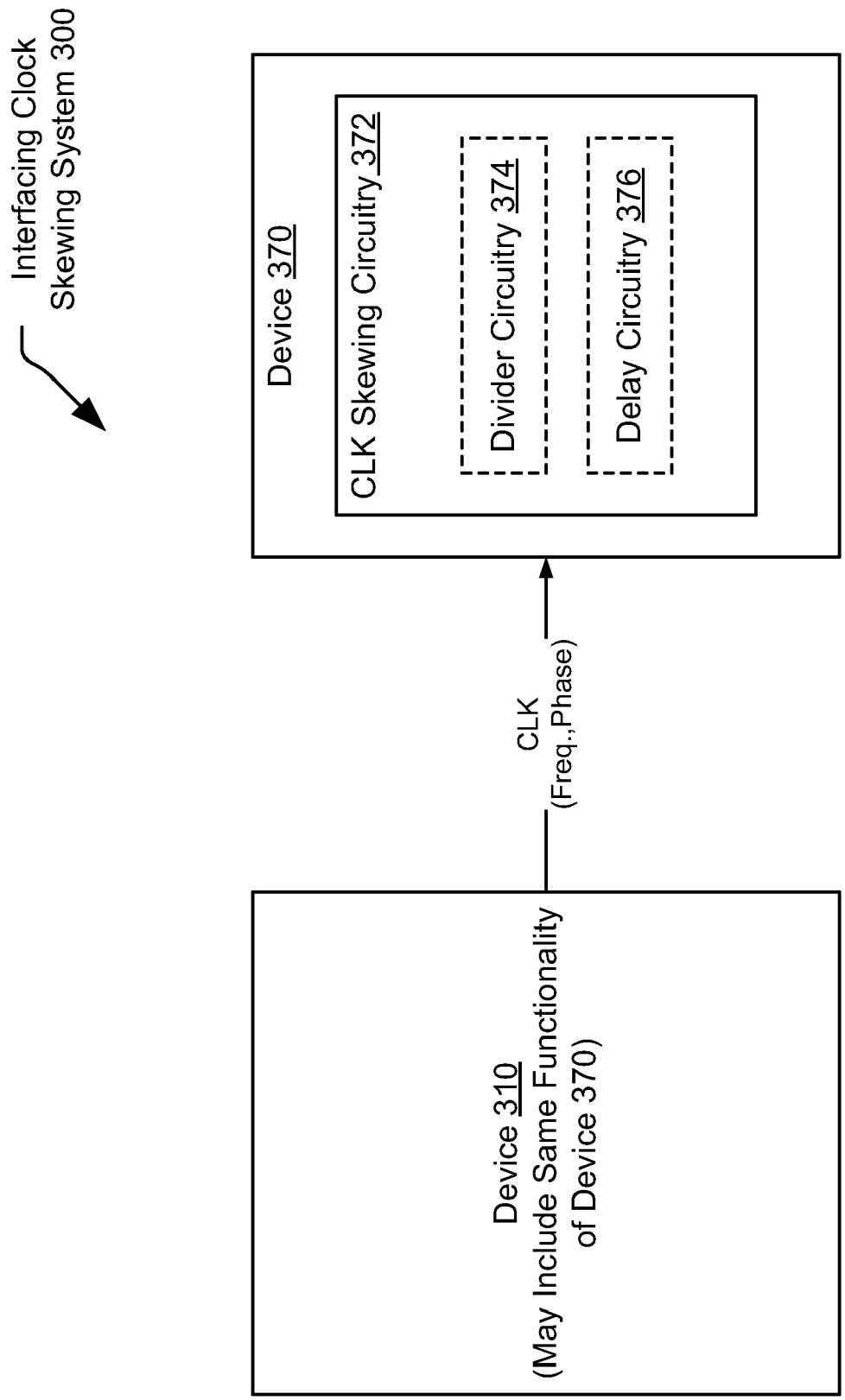
FIG. 3 is a system diagram illustrating another embodiment of an interfacing clock skewing system that is built in accordance with certain aspects of the present invention.

FIG. 3 is a system diagram illustrating another embodiment of an interfacing clock skewing system 300 that is built in accordance with certain aspects of the present invention. A device 310 is communicatively coupled to a device 370. Both of the devices 310 and 370 may include the same functionality in certain embodiments; alternatively, they may have different functionality. Within the FIG. 3, the clock signal provided from the device 310 to the device 370 includes a clock frequency and a phase. The device 370 includes a clock skewing circuitry 372. The clock skewing circuitry 372 is operable to perform frequency division, when necessary, to the received clock signal. Sometimes, the device 370 performs no dividing down at all; in such situations, it may be viewed that the divider circuitry 374 divides the received clock signal by a value of one (unity). The clock skewing circuitry 372 also employs a delay circuitry 376 in certain embodiments. The delay circuitry 376 is operable to switch in predetermined, fixed amounts of delay in certain embodiments. For example, when it is determined that a lowest operation communication frequency is employed, a longest available delay may be switched in. Alternatively, when it is determined that a highest operation communication frequency is employed, a shortest available delay may be switched in.

For example, in embodiments that are operable to perform communication using the Ethernet standards of 10BaseT, 100BaseT, and 1000BaseT, when it is determined that 10BaseT is in use between two devices, then a longest available delay of 8 nano-secs is switched in; alternatively, when it is determined that 1000BaseT is in use between two devices, then a shortest available delay of 2 nano-secs is switched in. Those persons having skill in the art will appreciate that the number of available delay cells may be selected appropriately to accommodate any number of communication speeds between various devices. The use of multiple delay cells will be appreciated when employing a phase locked loop (PLL) that may not be implemented to accommodate such a wide variety of operating frequencies. The use of multiple delay cells that may be switched in for the different operating speeds will assist to cover a broader range of clock skewing needs to ensure proper data sampling. The device 370 employs a phase locked loop (PLL), at least one embodiment of which is described below, to perform shifting/delaying/skewing of the received signal. Those persons having skill in the art will appreciate that the switching in of a predetermined number of fixed delay cells may be performed within a device that transmits a clock signal and/or a device that receives a clock signal. The present invention is operable to employ certain aspects of the present invention in devices that perform skewing of a clock signal before transmission and/or upon receipt of a signal. In certain embodiments, a single device performs all of the skewing of both input/output (I/O) signals, whereas the device with which it is communicatively coupled does no skewing at all.

Figure 4:
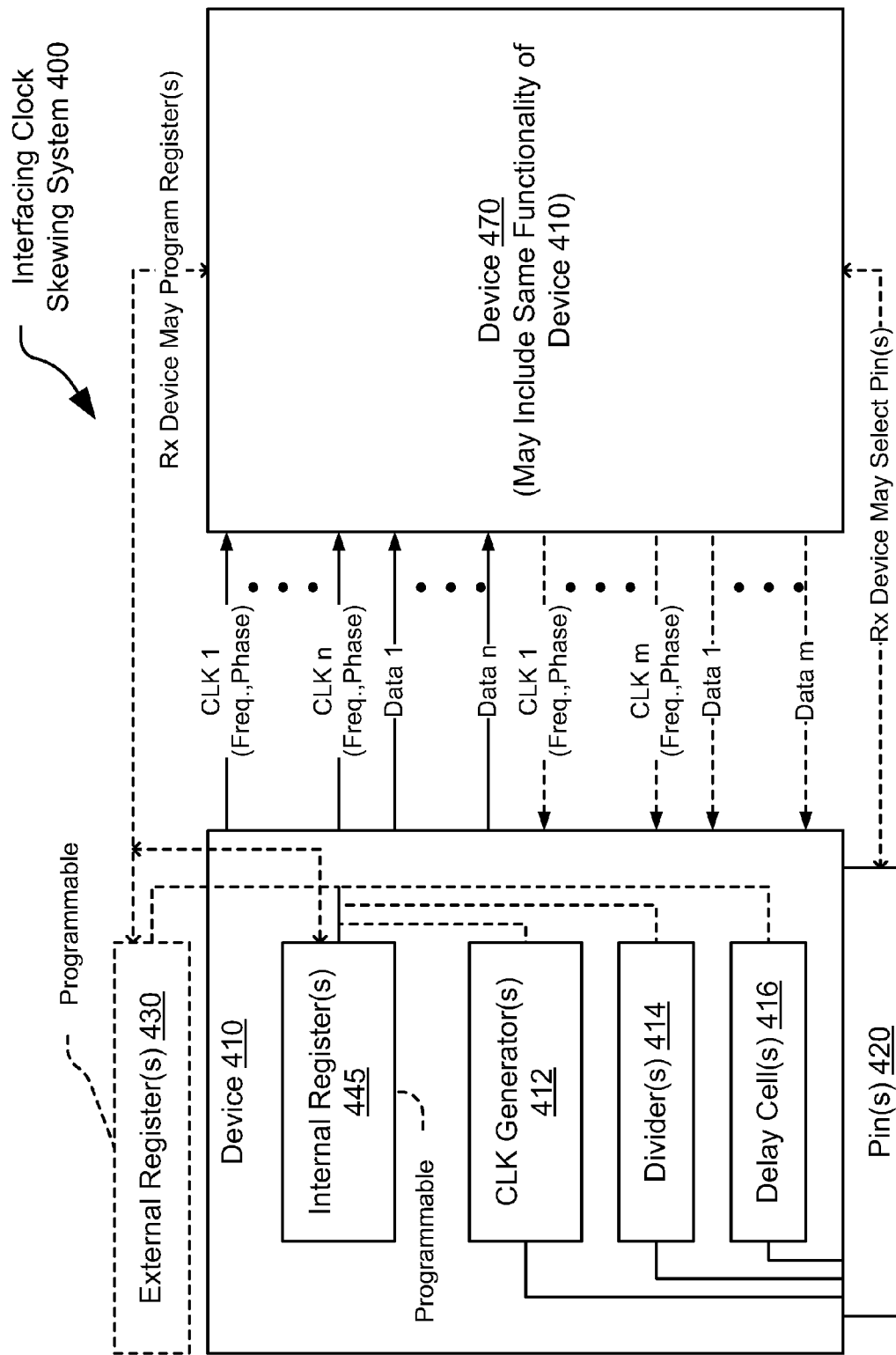
FIG. 4 is a system diagram illustrating another embodiment of an interfacing clock skewing system that is built in accordance with certain aspects of the present invention.

FIG. 4 is a system diagram illustrating another embodiment of an interfacing clock skewing system 400 that is built in accordance with certain aspects of the present invention. A device 410 is communicatively coupled to a device 470. Both of the devices 410 and 470 may include the same functionality in certain embodiments; alternatively, they may have different functionality. The device 410 includes one or more clock generators 412, one or more dividers 414, and one or more delay cells 416. Each of the clock generators 412, the dividers 414, and the delay cells 416 are programmable and selectable. That is to say, any number of clock frequencies having any number of phases/skews may be generated in the device 410 and provided to the device 470.

In addition, a number of clock signals (shown as clock 1, ..., and clock n) and data signals (shown as data 1, ..., and data n) may be provided to the device 470. During the clock cycles, the data may be transported on the rising or falling edge of the clock cycle without departing from the scope and spirit of the invention. The device 410 may include internal register(s) 445 and/or external register(s) 430. Each of the internal register(s) 445 and the external register(s) 430 may be programmable. The internal register(s) 445 and/or the external register(s) 430 may be used to select the clock frequency and phase of the clock signal, to be generated by the clock generators 412, the dividers 414, and the delay cells 416 within the device 410.

If desired, one or more pins 420 may also be used to select the clock frequency and phase of the clock signal, to be generated by the clock generators 412, the dividers 414, and the delay cells 416 within the device 410. As mentioned above, there may also be combinations of frequency and phase that may be selectable using the registers or pins. Alternatively, combinations of registers and/or combinations of pins may be used to select the various frequencies and phases of one or more clock signals and data signals to be provided by the device 410.

Irrespective of whether the register or the pins are used to program and select the clock and data signals, the receiving device may be used to program the registers (either the external registers 430 and/or the internal registers 420) and/or select one or more of the pins 420 that govern the functionality of the device 410. This may be n such a situation where auto detect/auto negotiation may also be performed where the device 470 determines and sizes up the capabilities of the device 410 and considers its own capabilities, and then it programs the frequency and phase/skew of clock signals and/or data signals that are appropriate between the two devices.

It is also noted that the functionality between the devices 410 and the device 470 may be reversed in direction, or the interaction may be bi-directional as well. Each device may interact with the other in various embodiments, and any handshaking between the devices may be used to select the parameters with which the two devices 410 and 470 are to interact. In addition, it will also be understood by those persons having skill in the art that a user may select the pins and/or registers to select the parameters with which the two devices 410 and 470 are to interact. In certain embodiments, only registers (330 and/or 435) are used to select these operational parameters. In others, only pins 420 are used to select the operational parameters. Moreover, combinations of registers and pins may be used to select the operational parameters.

It is also noted that either one or both of the device 410 and the device 470 may be operable clock skewing of both transmitted and received signals. In this situation, it is understood that the skewing of one or both of the transmitted and received signals may be selectable and/or programmable in accordance with certain aspects of the present invention as well. In certain embodiments, only one of the devices 410 and 470 is operable to perform clock skewing of both the transmitted and the received signals, whereas the other device performs no clock skewing at all. The present invention is operable to interface multiple devices when one of the devices does not even have the functionality to perform clock skewing, given that certain embodiments of the present invention enable clock skewing of both the transmitted and the received signals. It is also understood that the present invention is also operable to interface devices when one of the devices is operable to perform only one of clock skewing of a transmitted signal and a received signal.

For example, when a first device may perform only clock skewing of an output signal, a second device (employing the present invention) may accommodate the skewing to ensure that the first device receives a properly skewed signal. Alternatively, when a first device is not operable to perform clock skewing of an output signal, a second device (employing the present invention) may accommodate the skewing, this time on the receiving end, to ensure that it receives a properly skewed signal from the first device. The present invention is operable to adapt to any of these permutations. It is also noted that one of the devices may select the frequency and or phase of a clock signal based on the operational characteristics of the other device to which it is communicatively coupled. For example, when one device learns information of the capabilities of the other device, then the device may appropriately self-select or self-program its own functionality based on information of the device to which it is communicatively coupled.

From certain perspectives, the pins 420 and/or the registers 430 and 445 may be viewed as being communicatively coupled to a clock generation circuitry and/or a clock skewing circuitry within either one or both of the devices 410 and 470. This way, the skewing of a transmitted and/or a received signal may be selected and programmed within the device.

Figure 5:
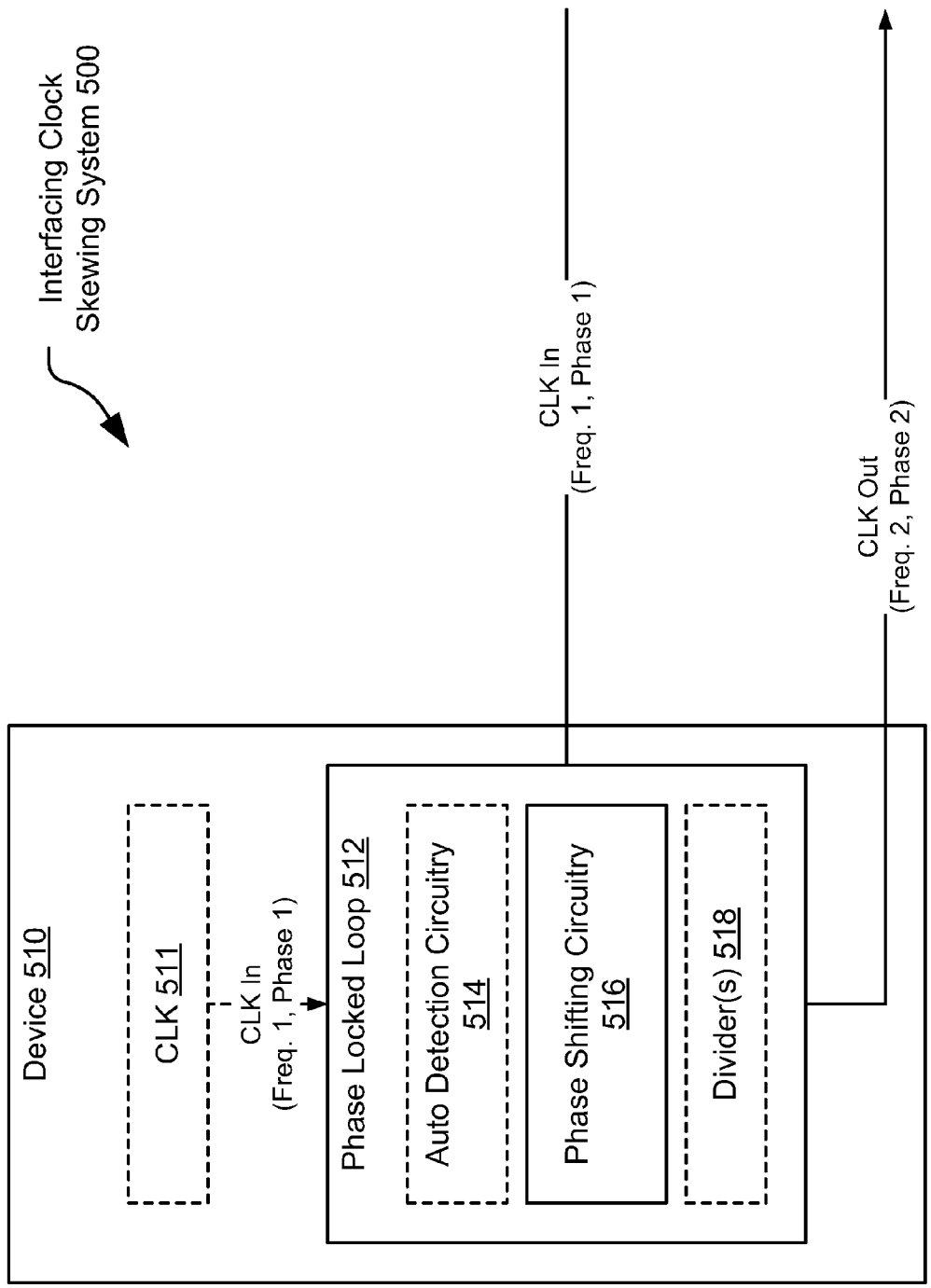
FIG. 5 is a system diagram illustrating another embodiment of an interfacing clock skewing system that is built in accordance with certain aspects of the present invention.

FIG. 5 is a system diagram illustrating another embodiment of an interfacing clock skewing system 500 that is built in accordance with certain aspects of the present invention. A device 510 includes a phase locked loop (PLL) 512. The PLL 512 is operable to perform phase shifting of a clock in signal (CLK In) having a frequency 1 and a phase 1. The phase shifting performed within the PLL 512 is performed by the phase shifting circuitry 516. The phase shifting circuitry 516 may employ any number of schemes to perform phase shifting/skewing of a signal, including using delay cells and/or manipulating the data using digital signal processing techniques. The clock signal that is used by the PLL 512 may be generated internally within the device 510 by a clock 511 or the clock signal may be received from an external device.

In addition in other embodiments, the PLL 512 also contains an auto detection circuitry 514 and one or more dividers 518. The clock in signal (CLK In), whether it be generated within the device 510 or whether it be provided from an external device, may be of a higher frequency and then divided down to generate a number of desired frequency. It will also be understood by those persons having skill in the art that other clock signals may be provided to the PLL without departing from the scope and spirit of the invention. These multiple clock signals may then be divided down to generate frequencies for use in even other applications.

The auto detection circuitry 514 may perform functionality known within the scope of auto negotiation where the device 510 is able to ascertain the capabilities of the any other device with which it desired to communicate. However, it is also understood and within the scope and spirit of the invention that the frequency and phase of any output/generated clock signal may be user programmed; alternatively the frequency and phase may be selected by an interactive device to which the device 510 is to communicate—this information may be ascertained also by the auto detect circuitry 514.

Using the ascertained information of the capabilities of the other devices, then the device 510 may then generate an output clock signal (CLK Out) having a frequency 2 and a phase 2. It is also noted that the output clock signal (CLK Out) may be provided internally to another functional block within the device 510 or alternatively to a functional block external to the device 510. Irrespective of where the output clock signal (CLK Out) is provided from the PLL 512 within the device 510 (whether it be internal or internal to the device 510), the present invention is operable to perform proper skewing of the signal to accommodate the interfacing.

In certain embodiments, it may very well be that the PLL 512 within the device 510 need not perform any modification to the clock in signal (CLK In) having the frequency 1 and the phase 1 (whether it be generated internally or provided by an external source). In this situation, the frequency 1 and the frequency 2 are the same; the phase 1 and the phase 2 are the same. However, as will often be the case, another device with which the device 510 is to communicate will require a clock signal having a frequency and phase differing from the clock in signal (CLK In) having the frequency 1 and the phase 1.

The present invention is adaptable to generate any number of output clock signals (CLKs Out) having the necessary frequency and phase/skew. The present invention is operable to obviate the need for the space consumptive delay lines to be placed on board of a device.

Figure 6:
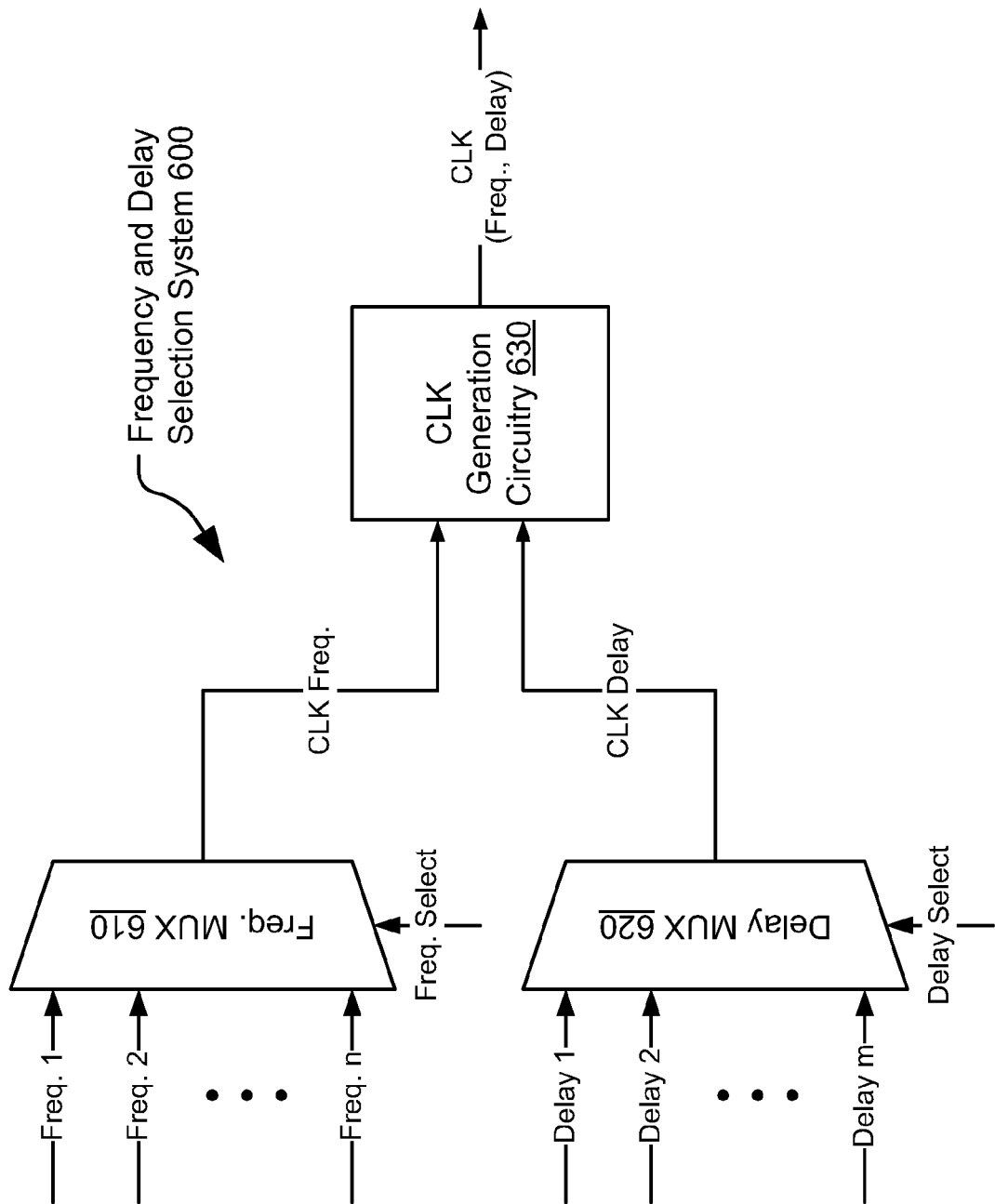
FIG. 6 is a system diagram illustrating an embodiment of a frequency and delay selection system that is built in accordance with certain aspects of the present invention.

FIG. 6 is a system diagram illustrating an embodiment of a frequency and delay selection system 600 that is built in accordance with certain aspects of the present invention. One of more frequency signals, shown as a frequency 1, a frequency 2, ..., and a frequency n are provided to a frequency MUX 610. A frequency select signal is provided to the frequency MUX 610 to perform the selection of the appropriate frequency for the given application. The selected clock frequency is provided to a clock generation circuitry 630. Analogously, one of more delays, shown as a delay 1, a delay 2, ..., and a delay n are provided to a delay MUX 620. A delay select signal is provided to the delay MUX 620 to perform the selection of the appropriate delay for the given application. The selected delay is also provided to a clock generation circuitry 630.

Within the clock generation circuitry 630, the selected frequency and the selected phase are combined and a clock signal having the appropriate frequency and phase is output from the clock generation circuitry 630. The frequency select signal and the delay select signal may be provided by any of the manners described within this patent application. The frequency select signal and the delay select signal may be provided independently or in combination. For example, a number of frequency-delay options may exit that ensure that the clock signal has the appropriate frequency and delay for the given application.

The FIG. 6 shows just one embodiment where the appropriate frequency and delay may be selected to generate an appropriate clock signal for communication of the clock signal and data between various devices. Other manners in which the frequency and delay may be selected are also included within the scope and spirit of the invention.

Figure 7:
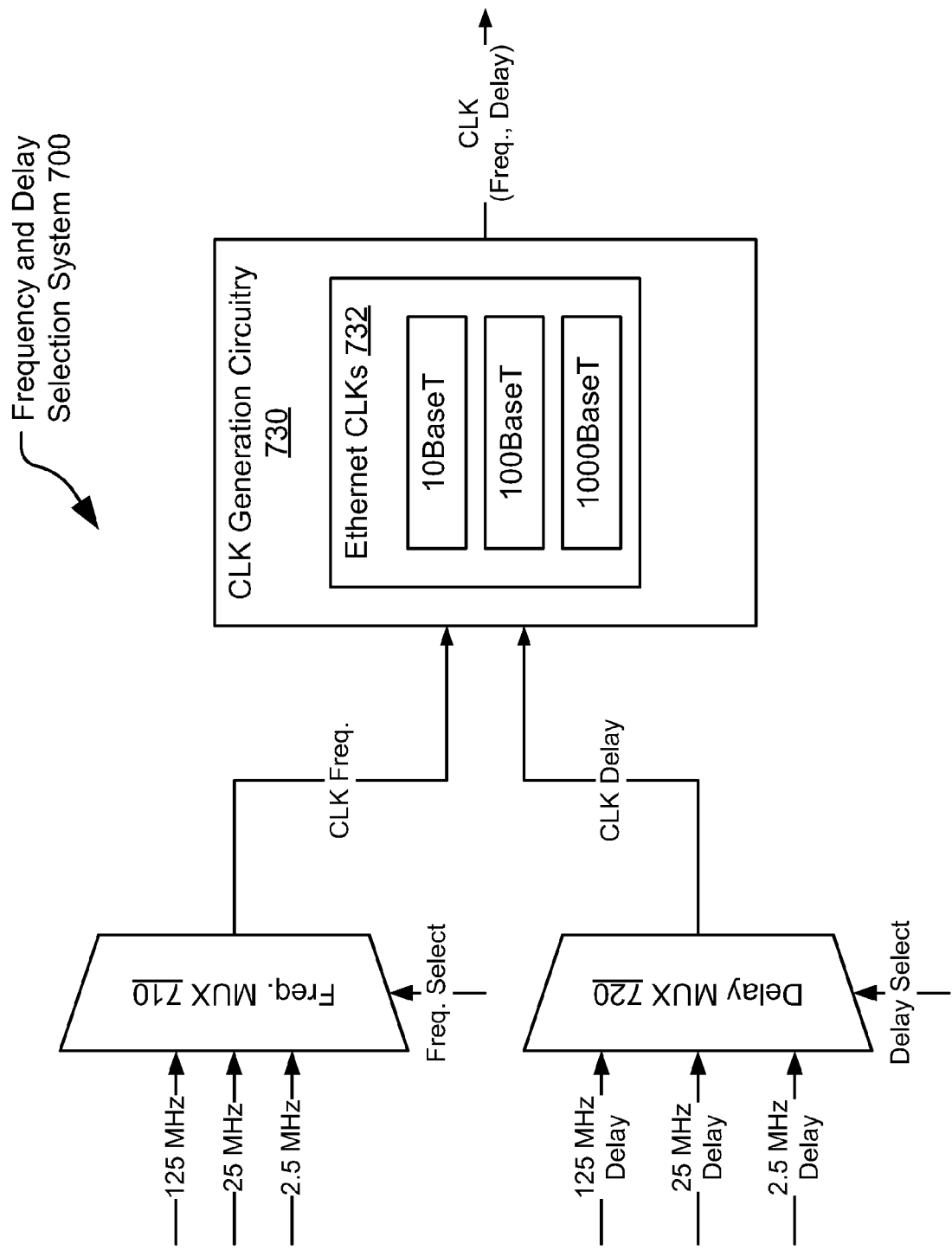
FIG. 7 is a system diagram illustrating another embodiment of a frequency and delay selection system that is built in accordance with certain aspects of the present invention.

FIG. 7 is a system diagram illustrating another embodiment of a frequency and delay selection system 700 that is built in accordance with certain aspects of the present invention. From certain perspectives, the FIG. 7 is one particular embodiment of a frequency and delay selection system that is built in accordance with the frequency and delay selection system 500 of the FIG. 5.

Particular values of the incoming frequency and delays are provided to a frequency MUX 710 and to a delay MUX 720.

For example, the frequencies of 125 MHz, 25 MHz, and 2.5 MHz are provided to the frequency MUX 710 where a frequency select signal selects which of the frequencies is to be output to a clock generation circuitry 730. Analogously, delays associated with the frequencies of 125 MHz (shown as a 125 MHz delay), 25 MHz (shown as a 25 MHz delay), and 2.5 MHz (shown as a 2.5 MHz delay) are provided to the delay MUX 720 where a delay select signal selects which of the delays is to be output to a clock generation circuitry 730.

For an illustration, in certain embodiments, if there is a need to introduce a 90 degree phase shift/clock skew for a 125 MHz clock signal, then a delay of 2 nano-secs may be introduced to skew the clock and set up a hole in the data. Similarly, if there is a need to introduce a 180 degree phase shift/clock skew for a 125 MHz clock signal, then a delay of 4 nano-secs may be introduced to skew the clock and set up a hole in the data. There are situations where a phase shift of degrees other than 90 degrees is required. Those persons having skill in the art will recognize the extendibility of certain aspects of the present invention to accommodate various phase and delay requirements between devices.

The clock generation circuitry 730 is operable to generate a number of Ethernet clock signals 732 including 10BaseT, 100BaseT, and 1000BaseT. The output clock signal has the appropriate frequency and delay that is required for the given Ethernet protocol that has been selected. The determination of the appropriate Ethernet protocol may be user-selected, defined and determined during start-up, initialization, and/or programmed by an external device. For example and as also described above, in embodiments that are operable to perform communication using the Ethernet standards of 10BaseT, 100BaseT, and 1000BaseT, when it is determined that 10BaseT is in use between two devices, then a longest available delay of 8 nano-secs is switched in; alternatively, when it is determined that 1000BaseT is in use between two devices, then a shortest available delay of 2 nano-secs is switched in. In this situation, the maximum delay may be viewed as being the 8 nano-secs delay, and the minimum delay may be viewed as being the 2 nano-secs delay.

Those persons having skill in the art will appreciate that the number of available delay cells may be selected appropriately to accommodate any number of communication speeds between various devices. The use of multiple delay cells will be appreciated when employing a phase locked loop (PLL) that may not be implemented to accommodate such a wide variety of operating frequencies. The use of multiple delay cells that may be switched in for the different operating speeds will assist to cover a broader range of clock skewing needs to ensure proper data sampling.

Figure 8:
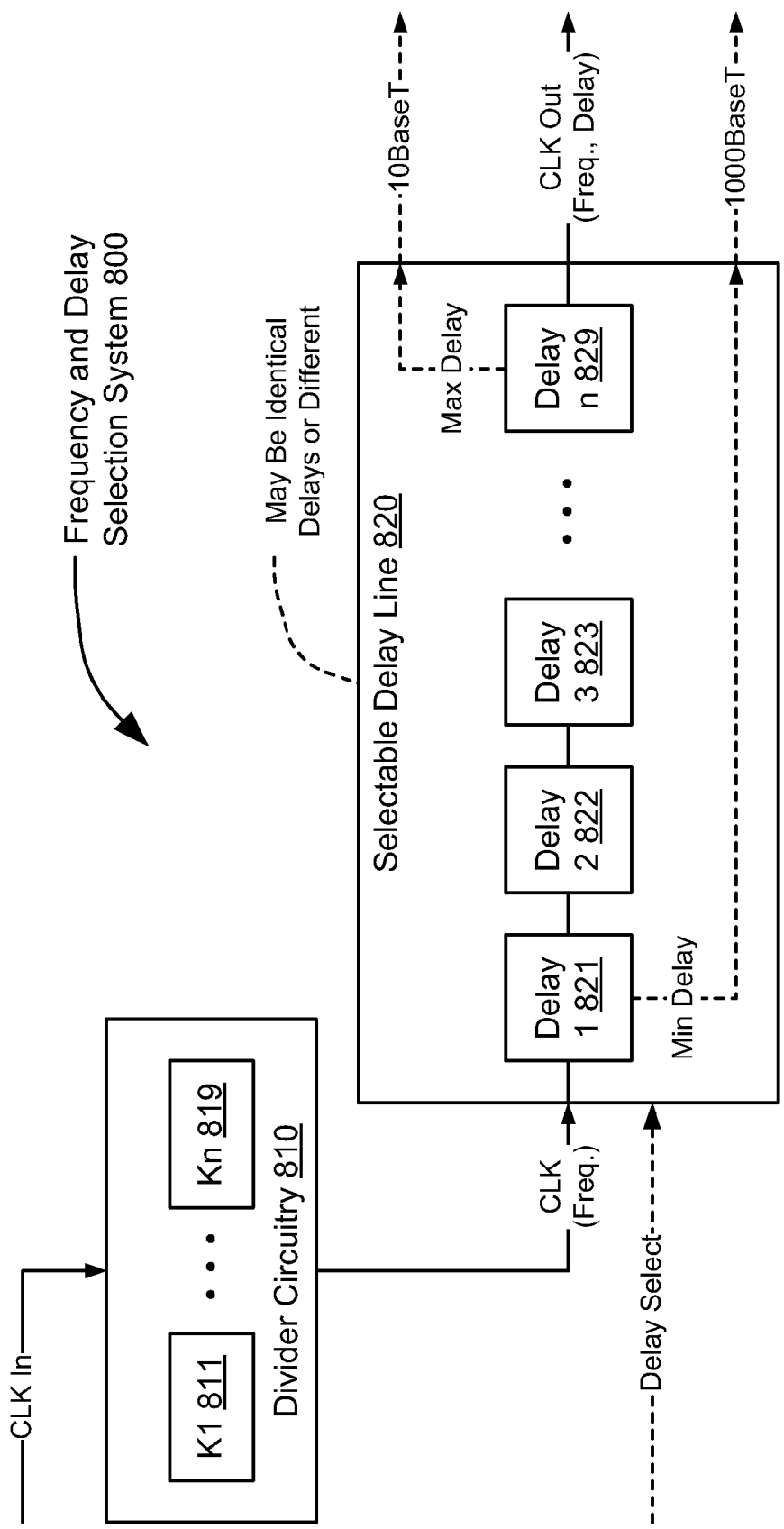
FIG. 8 is a system diagram illustrating another embodiment of a frequency and delay selection system that is built in accordance with certain aspects of the present invention.

FIG. 8 is a system diagram illustrating another embodiment of a frequency and delay selection system 800 that is built in accordance with certain aspects of the present invention. A clock in signal (CLK In) is provided to a divider circuitry 810. The divider circuitry 810 includes a number of constants, shown as K1 811, . . . , and Kn 819. The clock in signal (CLK In) may be divided down (by the divider circuitry 810) to generate any number of desired frequencies, as required or desired in the particular application. As an example, if a clock in signal (CLK In) is provided at 125 MHz, then it may be divided down by a factor of 5 to generate a 25 MHz clock frequency; if a clock in signal (CLK In) is provided at 125 MHz, then it may be divided down by a factor of 50 to generate a 2.5 MHz clock frequency. There may also be situations where no down division of the clock in signal (CLK In) need be performed, in which case the division constant is simply a value of one (unity).

The appropriate clock frequency, after having undergone any appropriate down dividing, is then passed to a selectable delay line 820. If desired, the selectable delay line 820 is operable to determine the appropriate delay line; alternatively, an external delay select signal is provided to the selectable delay line 820 to select the appropriate delay line. Any number of delay lines, shown as a delay 1 821, a delay 2 822, a delay 3 823, . . . , and a delay n 829, are implemented in various embodiments. The values of the delays 821-729 may be the same, or they may be different. A minimum delay may be provided after being passed from the delay 1 821. If no delay is desired, then the clock frequency is simply passed through the selectable delay line 820 without experiencing any delay at all; alternatively an output clock signal is passed directly out of the selectable delay line 820 without having gone incurred any delay or skewing within the selectable delay line 820.

A maximum delay may be provided by passing the clock frequency through all of the delay 1 821, the delay 2 822, the delay 3 823, . . . , and the delay n 829. Any available increment of delay 1 821, the delay 2 822, the delay 3 823, . . . , and the delay n 829 may be used to delay the clock frequency. When each of the delay 1 821, the delay 2 822, the delay 3 823, . . . , and the delay n 829 is the same delay length, then any fractionalized portion of the maximum delay may be selected. The delay 1 821, the delay 2 822, the delay 3 823, . . . , and the delay n 829 may alternatively be scaled differently in various embodiments. For example, the delays may be scaled exponentially to provide delay needs in other embodiments. The output clock has the proper frequency and delay as required to ensure proper data sampling between any number of devices.

It is understood that the operations of the frequency and delay selection system 800 may be performed in one or both of a receive device and a transmit device. Moreover, a single device may employ the functionality of the frequency and delay selection system 800 within both transmit and receive paths. For example, as described within various embodiments of the present invention, a single device may perform skewing of a clock signal emitted from it as well as skewing of a clock signal received within it.

Figure 9:
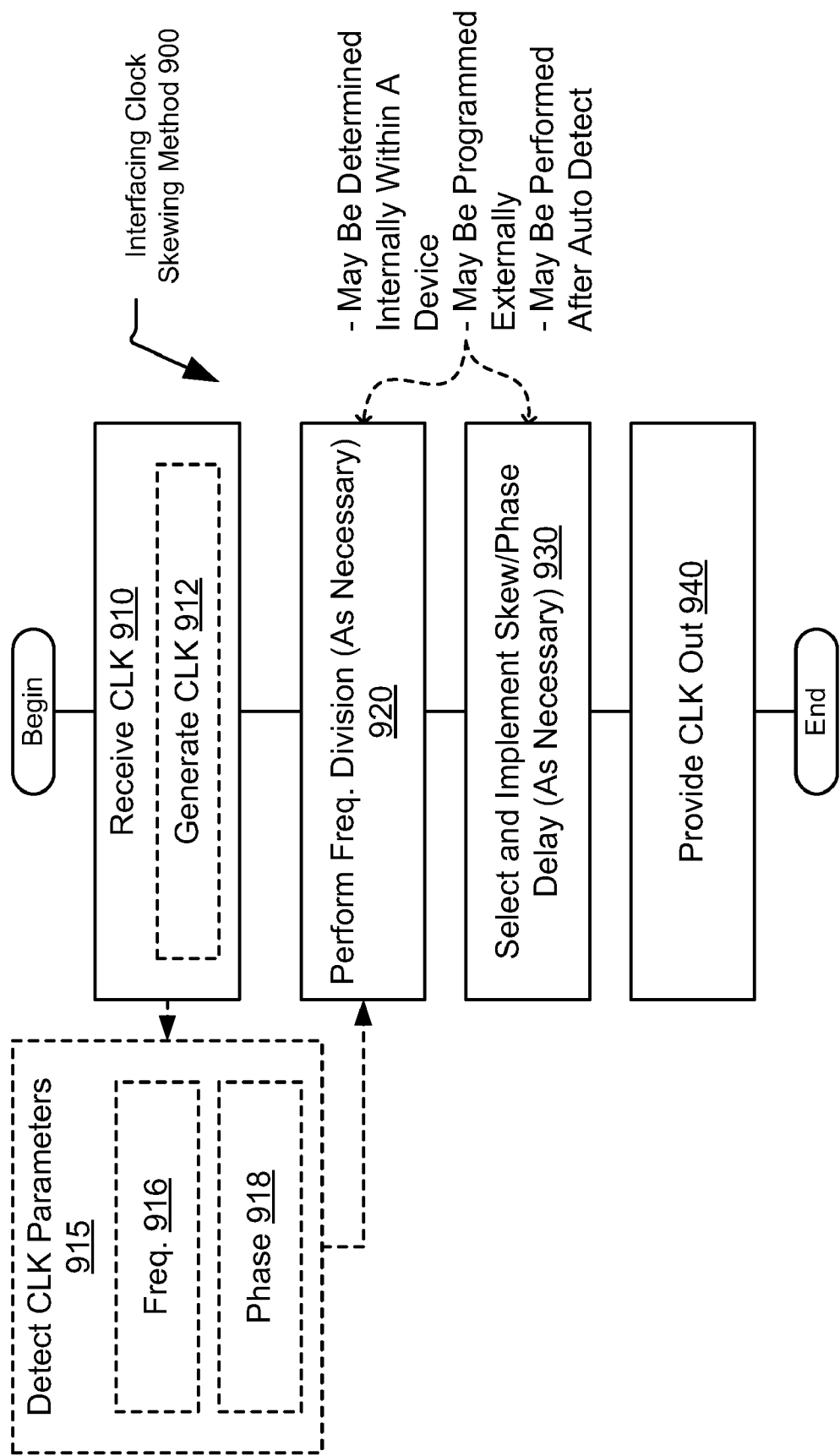
FIG. 9 is a functional block diagram illustrating an embodiment of an interfacing clock skewing method that is performed in accordance with certain aspects of the present invention.

FIG. 9 is a functional block diagram illustrating an embodiment of an interfacing clock skewing method 900 that is performed in accordance with certain aspects of the present invention. In a block 910, a clock signal is received.

Alternatively, the clock signal is generated in a block 912. In alternative embodiments, the parameters in the clock signal are detected; these parameters may include frequency 916 and phase 918.

Then, in a block 920, any necessary frequency division is performed. Then, in a block 930, the selected skew/phase delay is implemented into the clock signal. Then, in a block 940, the clock signal is then provided to an appropriate device with which the clock signal is to communicate.

Any necessary frequency division (block 920) and any necessary skewing/phase delay (block 930) may be performed internally within a device. They may alternatively be programmed externally; they may also be performed after auto detect and/or auto negotiation.

In certain instances, various aspects of the invention can be found in an inter-device adaptable interfacing clock skewing system. In certain embodiments, a phase locked loop (PLL) locks into a first clock signal and creates a second clock signal with a predetermined delay, such as 2 micro-sec delay. In addition, a clock signal having a higher frequency may be created and then divided down to generate another clock signal having the desired frequency. For example, when a clock signal of frequency 'f' is desired, a clock signal of frequency '2f' may be employed. From the clock signal having twice the frequency, the desired clock frequency may be achieved by dividing down the higher clock frequency by the appropriate factor. This all may be performed within a device, or chip, thereby obviating the need for the space consumptive delay lines implemented on board between multiple devices. Moreover, a large number of clock signals may be generated to meet a whole host of interfacing and clock skewing requirements, all within a signal device. Herein, the device may also be programmable to accommodate any number of interfacing needs. Therefore, a single device may be easily adapted to interface to a number of other devices. In contradistinction to the prior art situation, where the appropriate delay line would need to be chosen for the specific application, the necessary and required delay/skewing and/or frequency division may be performed within a transmitting device itself; alternatively, it may be performed in a receiving device that receives the clock signal, performing the transformation of the incoming clock signal to the desired frequency and phase.

The adaptability of the clock signals frequency and phase may be performed in other ways as well. There may be pins on the device that are operable to do the selection or registers may be programmed to perform the selection. Both the frequency and phase shifting/skewing may be programmed independently, or combinations of frequency and phase may be combined, so that particular combination-applications may be programmed using a single pin. For example, a single pin may be used to select a frequency-phase combination. Moreover, in some embodiments, the device may be intelligent, in that, it detects the type of device to which it is to interface, and then it adapts (or self selects) to use the proper frequency and phase of the clock signal that is used to perform communication between the devices. For example, auto detect functionality may be implemented so that the device knows what speed at which it is capable to operate and at which rate the device to which it is to communicate is capable of operating. For example, auto negotiation functionality may be implemented so that the devices can measure up the capability and functionality that each of the two devices may support.

If desired, a selectable number of interfacing options are available at which the interfacing may be performed between various devices. For example, in one embodiment, three options are available including 10BaseT, 100BaseT, and 1000BaseT as understood by those persons having skill in the art. Other groups of functionality may be used as well. This implementation may be performed a number of ways, including using multiplexors (MUXs) and other selectable devices within the devices. External programmability and external pin selection may be used to perform the selection within a transmitting and/or receiving device to ensure that the interfacing is appropriate. Multiple MUXs may also be used to select the desired frequency and delay/phase/skew of a clock signal within either of the transmit and receive devices. It will be understood by those persons having skill in the art that many of the devices have transceiver functionality, where they are operable to perform both transmission and receipt of information.

It is also noted that the present invention is adaptable to performing skewing of a clock signal as it is received in a device as well. If desired, a single device may perform skewing of both a transmitted and a received clock. The present invention is also operable to perform clock skewing to provide for proper data sampling to both the transmit and receive clock signals within the single device at multiple communication frequencies. Those persons having skill in the art will appreciate that the present invention is operable to provide for effective skewing to a transmit signal and/or a receive signal in various embodiments.

In view of the above detailed description of the invention and associated drawings, other modifications and variations will now become apparent. It should also be apparent that such other modifications and variations may be effected without departing from the spirit and scope of the invention.

What is claimed is:

1. An apparatus, comprising:
 a first multiplexor (MUX) for selecting a clock frequency from among a plurality of clock frequencies based on a first select signal;
 a second MUX for selecting a clock delay from among a plurality of clock delays based on a second select signal; and
 a clock generation circuitry for generating a clock signal based upon the selected clock frequency and the selected clock delay; and wherein:
 the apparatus being a first integrated circuit;
 the first integrated circuit being coupled to a second integrated circuit; and
 the second integrated circuit providing at least one of the first select signal and the second select signal to the first integrated circuit.

2. The apparatus of claim 1, further comprising:
 a first pin; and
 a second pin; and wherein:
 the first select signal is a first input received via the first pin; and
 the second select signal is a second input received via the second pin.

3. The apparatus of claim 1, further comprising:
 a pin; and wherein:
 at least one of the first select signal and the second select signal is received via the pin.

4. The apparatus of claim 1, the clock generation circuitry further comprising:
 at least one of a clock generator, a divider, and a delay cell for generating the clock signal.

5. The apparatus of claim 4, wherein:
 an input of the clock generation circuitry selecting at least one operational parameter employed by at least one of the clock generator, the divider, and the delay cell.

6. The apparatus of claim 5, further comprising:
 a pin; and wherein:
 the input being received via the pin.

7. The apparatus of claim 1, wherein:
 the first integrated circuit providing the clock signal to the second integrated circuit.

8. The apparatus of claim 1, wherein:
 the first integrated circuit providing the clock signal to the second integrated circuit; and
 the second integrated circuit providing data to the first integrated circuit.

9. The apparatus of claim 1, wherein:
 the first integrated circuit providing the clock signal to the second integrated circuit; and
 the first integrated circuit providing data to the second integrated circuit.

10. The apparatus of claim 1, wherein:
 the first integrated circuit providing the clock signal and at least one additional clock signal to the second integrated circuit.

11. The apparatus of claim 1, wherein:
 the apparatus is a communication device operative in accordance with at least one Ethernet standard.

12. The apparatus of claim 1, wherein:
the selected clock delay effectuating a selected phase shift within the clock signal.

13. The apparatus of claim 1, further comprising:
a register containing information concerning at least one of a phase, a frequency, and a delay of the clock signal; and
an input of the apparatus for selecting at least one of the phase, the frequency, and a delay of the clock signal from a predetermined plurality of phases, a predetermined plurality of frequencies, and a predetermined plurality of delays stored within the register; and wherein:
the clock generation circuitry generating the clock signal based on the input selected information concerning at least one of the phase, the frequency, and the delay of the clock signal.

14. The apparatus of claim 13, wherein:
the register being either an internal register contained within the first integrated circuit or an external register coupled to the first integrated circuit.

15. An apparatus, comprising:
a clock generation circuitry for generating a clock signal;
a first input for receiving a first select signal to select a phase of the clock signal before the clock signal is generated by the clock generation circuitry;
a second input for receiving a second select signal to select a frequency of the clock signal before the clock signal is generated by the clock generation circuitry; and
an output for providing the clock signal; and wherein:
the clock generation circuitry employing at least one of a clock generator, a divider, and a delay cell for generating the clock signal.

16. The apparatus of claim 15, wherein:
the first input being a first pin; and
the second input being a second pin.

17. The apparatus of claim 15, wherein:
at least one of the first select signal, the second select signal, and at least one additional select signal selecting at least one operational parameter of at least one of the clock generator, the divider, and the delay cell.

18. The apparatus of claim 17, wherein:
at least one of the first select signal, the second select signal, and at least one additional select signal selecting at least one operational parameter of the delay cell; and
the delay cell operating to effectuate the selected phase of the clock signal.

19. The apparatus of claim 15, further comprising:
a first multiplexor (MUX) for selecting the phase from among a plurality of phases based on the first select signal; and
a second MUX for selecting the frequency from among a plurality of frequencies based on the second select signal.

20. The apparatus of claim 15, wherein:
the apparatus being a first integrated circuit;
the first integrated circuit being coupled to a second integrated circuit; and
the first integrated circuit providing the clock signal to the second integrated circuit.

21. The apparatus of claim 15, wherein:
the apparatus being a first integrated circuit;
the first integrated circuit being coupled to a second integrated circuit;
the first integrated circuit providing the clock signal to the second integrated circuit; and
the second integrated circuit providing data to the first integrated circuit.

22. The apparatus of claim 15, wherein:
the apparatus being a first integrated circuit;
the first integrated circuit being coupled to a second integrated circuit;
the first integrated circuit providing the clock signal to the second integrated circuit; and
the first integrated circuit providing data to the second integrated circuit.

23. The apparatus of claim 15, wherein:
the apparatus being a first integrated circuit;
the first integrated circuit being coupled to a second integrated circuit; and
the first integrated circuit providing the clock signal and at least one additional clock signal to the second integrated circuit.

24. The apparatus of claim 15, wherein:
the apparatus being a first integrated circuit;
the first integrated circuit being coupled to a second integrated circuit; and
the second integrated circuit providing at least one of the first select signal and the second select signal to the first integrated circuit.

25. An integrated circuit, comprising:
a clock generation circuitry for generating a clock signal;
a first input for receiving a first select signal to select a phase of the clock signal before the clock signal is generated by the clock generation circuitry;
a second input for receiving a second select signal to select a frequency of the clock signal before the clock signal is generated by the clock generation circuitry; and
an output for providing the clock signal to at least one additional integrated circuit; and wherein:
the clock generation circuitry employing at least one of a clock generator, a divider, and a delay cell for generating the clock signal; and
at least one of the first select signal and the second select signal selecting at least one operational parameter of at least one of the clock generator, the divider, and the delay cell.

26. The integrated circuit of claim 25, wherein:
the first input being a first pin; and
the second input being a second pin.

27. The integrated circuit of claim 25, wherein:
at least one of the first select signal and the second select signal selecting at least one operational parameter of the delay cell; and
the delay cell operating to effectuate the selected phase of the clock signal.

28. The integrated circuit of claim 25, further comprising:
at least one additional output for providing at least one of data and at least one additional clock signal to the at least one additional integrated circuit.

29. The integrated circuit of claim 25, further comprising:
at least one additional input for receiving data from the at least one additional integrated circuit; and wherein:
the at least one additional integrated circuit providing at least one of the first select signal and the second select signal to the integrated circuit.

30. The integrated circuit of claim 25, further comprising:
a register containing information concerning at least one of the phase, the frequency, and a delay of the clock signal; and wherein:

at least one of the first input the second input selecting at least one of the phase, the frequency, and the delay of the clock signal from a predetermined plurality of phases, a predetermined plurality of frequencies, and a predetermined plurality of delays stored within the register, respectively; and the clock generation circuitry generating the clock signal based on the input selected information concerning at least one of the phase, the frequency, and the delay of the clock signal.

* * * * *

UNITED STATES PATENT AND TRADEMARK OFFICE
CERTIFICATE OF CORRECTION

| | | |
|---|---|---|
| PATENT NO. | : 8,254,513 B2 | Page 1 of 1 |
| APPLICATION NO. | : 12/830434 | |
| DATED | : August 28, 2012 | |
| INVENTOR(S) | : Andrew J. Castellano et al. | |

It is certified that error appears in the above-identified patent and that said Letters Patent is hereby corrected as shown below:

In the Claims:

Col. 13, line 1, in claim 30: after "at least one of the first input" insert --and--

Signed and Sealed this
Twenty-sixth Day of November, 2013

Margaret A. Focarino
*Commissioner for Patents of the United States Patent and Trademark Office*